Aug. 14, 1956 M. I. ZWELLING 2,758,796
MACHINE FOR WINDING COILS
Filed Feb. 25, 1952
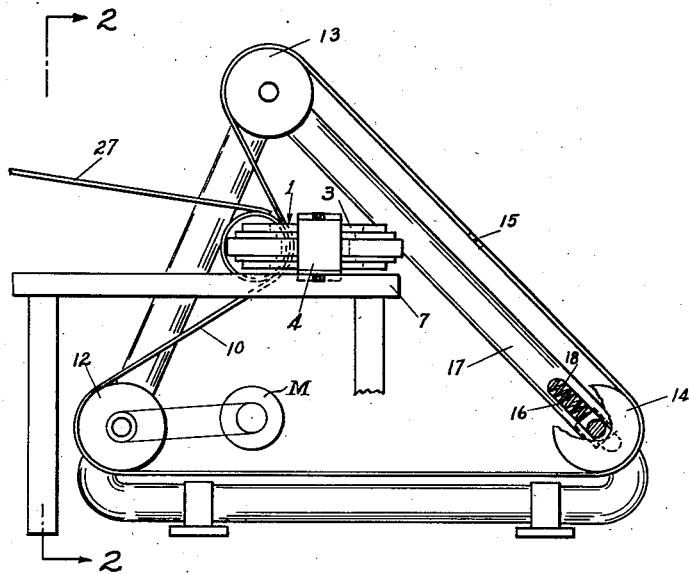
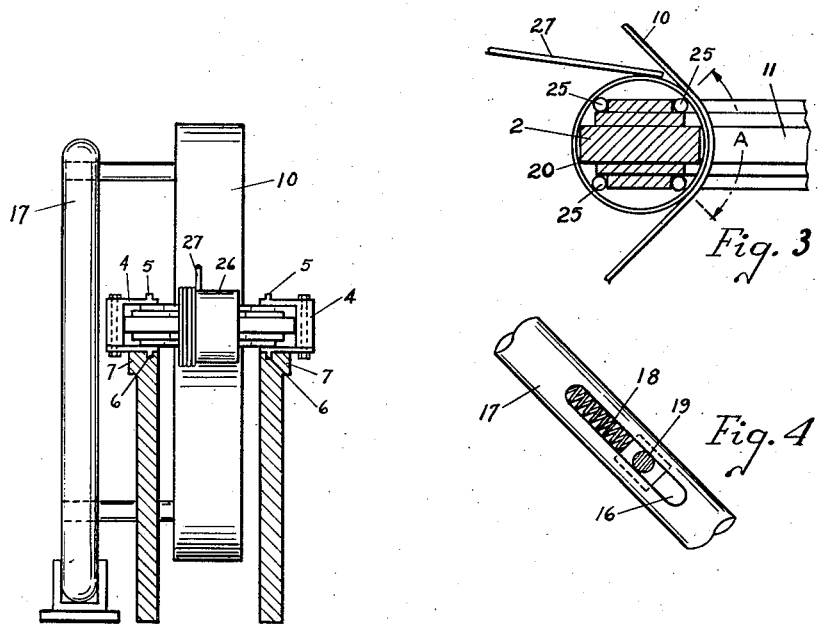
INVENTOR.
Martin I. Zwelling
BY
Attorney

United States Patent Office 2,758,796
Patented Aug. 14, 1956

2,758,796

MACHINE FOR WINDING COILS

Martin I. Zwelling, Zanesville, Ohio, assignor to McGraw Electric Company, Milwaukee, Wis., a corporation of Delaware Application February 25, 1952, Serial No. 273,169

2 Claims. (Cl. 242—4)

This invention relates to a method and machine for winding a coil in place on a magnetic core.

The invention has for its object a method and machine for winding coils on a closed magnetic core, or any type of magnetic core where the finished coil cannot be slipped over the core.

Another object of this invention is to provide a method and machine for winding coils on a closed magnetic core where it is undesirable because of size or other circumstances to provide removable winding flanges driven by gears or belts as have heretofore been used.

Specifically, it is an object of the present invention to provide a method and machine for winding coils on a closed magnetic core by means of a revoluble flexible belt frictionally engaging a substantial portion annularly and axially of the periphery of the coil whereby undue winding stresses ordinarily affecting relatively fragile winding layers are distributed across the entire axial length and a substantial portion of the annular surface of the coil.

The invention is particularly applicable to winding coils on closed cores for transformers or the like, which are constructed in accordance with the disclosure of the Steinmayer et al. Patent No. 2,288,855, granted on July 7, 1942, and assigned to the same assignee as the present invention. This patent pertains to a method and means for making cores for transformers or the like, in which the cores are wound from elongated magnetic materials to form closed cores. The present method is particularly advantageous for winding bell ringing or other small core transformers having relatively smaller core windows leaving little or no room for winding flanges.

More specifically, objects of this invention are to provide a method of winding a coil on a closed magnetic core wherein the core is held in a stationary position, such winding machines being provided with a flexible driving belt which directly frictionally engages the coil itself and has a width substantially equal to or greater than the length of the finished coil width, and which belt is held in constant tension to provide intimate contact with the wire and/or insulating layers being wound upon the core.

It is to be distinctly understood that in all references to "coil" it is intended that any coil structure shall be included whether the coil structure includes both a primary and a secondary, as in a transformer, for instance, or a separate primary or secondary, or other single coil as in a choke.

Embodiments of the invention are shown in the accompanying drawing, in which:

Fig. 1 is an elevational view, partly in section, showing one form that the winding machine may take.

Fig. 2 is a sectional view taken on line 2—2 of Fig. 1 showing the coil being wound upon a closed core with the flexible driving belt frictionally engaging the coil throughout its entire axial length.

Fig. 3 is a fragmentary enlarged view of a leg portion of a transformer core illustrating the substantial annular portion of the coil being frictionally engaged by the flexible driving belt.

Fig. 4 is a fragmentary view of a portion of the winding machine illustrating one form of supplying tension to the revoluble flexible belt.

Referring to the drawing, it will be seen in Fig. 1 that the method and machine are especially applicable to winding a coil on a closed magnetic core 1 made in accordance with the disclosure of the above-mentioned patent to Steinmayer et al. This type of core has legs 2 wound in stepped layers to provide a cruciform cross section. The core 1 may be clamped for winding operations at its yoke portions 3 with clamps 4. The clamps have shoulder portions 5 and 6 slidable in parallel grooves of the ways 7.

In accordance with this invention, the free ends of a flexible belt 10 are threaded through the window 11 of the core 1 and preferably looped over a drive pulley 12, an idler pulley 13, and a tensioning pulley 14. The free ends of the belt are then joined with a suitable coupling 15. The drive pulley 12 may be driven with any suitable means, such as an electrical motor M which is shown only schematically in Fig. 1 of the drawing, since this is not a critical feature of the invention, and any type of drive means for pulley 12 would be satisfactory. The motor is equipped with a suitable start and stop switch (not shown). The belt 10 is preferably placed under constant tension to provide intimate driving contact during winding operations. A convenient means of supplying this tension is shown, with reference to Fig. 4, by the use of a laterally movable pulley 14 positioned in a slotted portion 16 of the supporting frame 17. A spring means 18 continually urges the axle 19 of the pulley 14 towards a belt-tensioning direction.

Operation of the machine is as follows:

After the clamps 4 have been fastened to the core 1 and the shoulders 5 positioned in the grooves of the ways 7, a permanent insulating shell 20 is placed over the leg portion 2 of the core 1. The shell 20 may take the form of a suitable length of strip insulating material, or of the preformed, split insulating shell disclosed in the patent to Nelson, Patent No. 2,441,439 of May 11, 1948 and assigned to the same assignee as the present invention. Where strip insulating material is preferred, this may be positioned on the leg portion by a simple hand wrapping operation, or by use of the flexible belt 10 under the practice of the present invention, as described hereinbelow.

At times it may be preferable, espectially when winding coils on relatively large cores, to provide bearings 25, or other friction-reducing means. The bearings may be removed after winding operations are completed.

It was found that during winding operations, especially when bearings 25 were omitted, that ordinary paper insulation often proved unsatisfactory inasmuch as the high frictional forces between the belt and insulation or the winding wire was greater than the frictional forces between paper insulation and wire. This resulted in the belt pulling the paper or the wire, whichever was being wound, through and beyond the coil, preventing complete winding. The problem was effectively solved by dipping the insulating paper in a very thin solution of synthetic rubber cement. The paper with its adhesive coating 26 has sufficient attraction to the wire or other insulation to prevent the belt from pulling it through.

With the ends of the flexible belt 10 coupled, and the belt placed in operating position, the motor M is operated at an appropriate speed. The core is brought into position, as shown in Fig. 1, by sliding it along the ways 7.

Where it is deemed preferable to provide an insulating shell 20 of wrapped strip material (not shown), this material may be wound on the core leg portion 2 by frictionally engaging the material with the outer surface of the belt 10 and winding the desired number of layers thereon. The bearings 25 may then be inserted between the shell and the core leg portion to reduce friction.

The winding 27 is next started around the shell 20 with its end portions tied or anchored in any suitable manner, such as disclosed for example, in the copending application of H. V. Adcock, filed on June 13, 1951, Serial No. 231,397, now Patent No. 2,661,446, and assigned to the same assignee as the present invention. The leads and end portions have been omitted from the drawing for the sake of clearness.

The process is continued until the desired amount of wire and insulating layers have been wound to form a coil of the requisite number of turns. When the winding has been completed, the end turns (not shown) may be secured in place in any suitable manner as disclosed, for example, in the above mentioned copending Adcock application. The flexible belt 10 is next removed by detaching the coupling 15.

After completion of the coil, any suitable means may be used for locking the coil in place. For instance, wedges (not shown) formed of insulating material may be driven in place between the magnetic core leg portion 2 and the permanent insulating shell 20 of the coil. Where it is desired to provide two conducting windings, the core structure 1 may be flipped over, with the opposite shoulders 6 of the clamps 4 engaging the parallel grooves in the ways 7. The second coil (not shown) is then wound in the same manner as above described.

The primary advantages to the present method of winding coils on closed magnetic cores include the fact that the winding stresses are distributed uniformly throughout the entire axial length of the coil, in addition to having a substantial portion A of the annular surface of the coil frictionally contacted by the flexible belt 10. In the past, there have been many suggestions for winding coils on closed cores. A very successful method of doing so has been in accordance with the disclosure of the Steinmayer et al., Patent No. 2,305,999, mentioned hereinabove. Under the teachings of that patent, winding stresses are distributed uniformly throughout the length of the coil. However, there are certain instances when it is not commercially feasible to use the split flanges at either end of the cool as suggested by this patent disclosure. This is especially true in the case of winding relatively small coils and cores used in the electronics field.

The winding wire used on small coils is generally of a relatively finer diameter, and is commercially available with only light surface coatings of plastic or other insulation. The problem often arises in connection with the use of relatively inexpensive frictional driving mechanisms, of tearing the winding wire or scraping the insulation from the wire during winding. This is especially true where the only means of contact between the driving mechanism and the rotating coil is upon a single winding or a very few windings, as for instance, the start of each layer.

The present invention suggests the use of a flexible belt which has a width substantially identical to or greater than the axial length of the coil being wound to thereby distribute the winding stresses evenly across the coil in addition to a substantial portion of the annular surface.

It will be seen that a very simple machine has been provided for winding coils on closed magnetic cores, particularly on closed magnetic cores within a driving means contacting the winding by direct frictional engagement. The winding stresses are distributed uniformly, and the necessity for end flanges fitted to the insulating shell avoided.

Although the invention is applicable to winding a coil on any type of core, it is particularly applicable to the winding of a coil on a closed magnetic core such as that formed of wound magnetic ribbon.

I claim:

1. In a machine for winding a conducting coil on a closed magnetic core having a revoluble coil supporting shell positioned on a leg portion thereof, a supporting frame, belt pulleys rotatably mounted at spaced points on said frame, drive means for one of said pulleys, a flexible drive belt revolubly supported by said pulleys, tensioning means for said belt, a guide platform having guideways therein, core clamping means slidable in said guideways and supporting said core, said guide platform being directed transversely of said belt between at least two of said pulleys whereby said slidable core is movable against said belt to provide a driving relationship between said belt and said revoluble shell, said flexible belt having a width equal to or greater than the axial length of the shell and being of a length to frictionally engage a substantial annular portion of said shell when said core is moved along said guide platform against the belt.

2. In a machine for winding a conducting coil on a closed magnetic core having a central opening therein and a revoluble coil supporting shell positioned on a leg portion thereof, a supporting frame, belt pulleys rotatably mounted at spaced points on said frame, drive means for one of said pulleys, a flexible drive belt revolubly supported by said pulleys and threaded through said opening, said belt having disengageable fastening means for the free ends thereof, tensioning means for said belt, a guide platform having guideways therein, core clamping means slidable in said guideways and supporting said core, said guide platform being directed transversely of said belt between at least two of said pulleys whereby said slidable core is movable against said belt to provide a driving relationship between said belt and said revolubic shell, said flexible belt having a width equal to or greater than the axial length of the shell and being of a length to frictionally engage a substantial annular portion of said shell when said core is moved along said guide platform against the belt.

References Cited in the file of this patent

UNITED STATES PATENTS

| | | |
|---|---|---|
| 1,955,741 | Eitzen | Apr. 24, 1934 |
| 1,959,418 | Fourness | May 22, 1934 |
| 1,970,995 | Diehl | Aug. 21, 1934 |
| 2,179,094 | Joss | Nov. 7, 1939 |
| 2,193,044 | Sibley | Mar. 12, 1940 |
| 2,246,239 | Brand | June 17, 1941 |
| 2,334,131 | Schultz | Nov. 9, 1943 |
| 2,353,821 | Fourness et al. | July 18, 1944 |
| 2,367,086 | Barry | Jan. 9, 1945 |
| 2,414,603 | Nelson | Jan. 21, 1947 |
| 2,452,733 | Conklin | Nov. 2, 1948 |